UNITED STATES PATENT OFFICE.

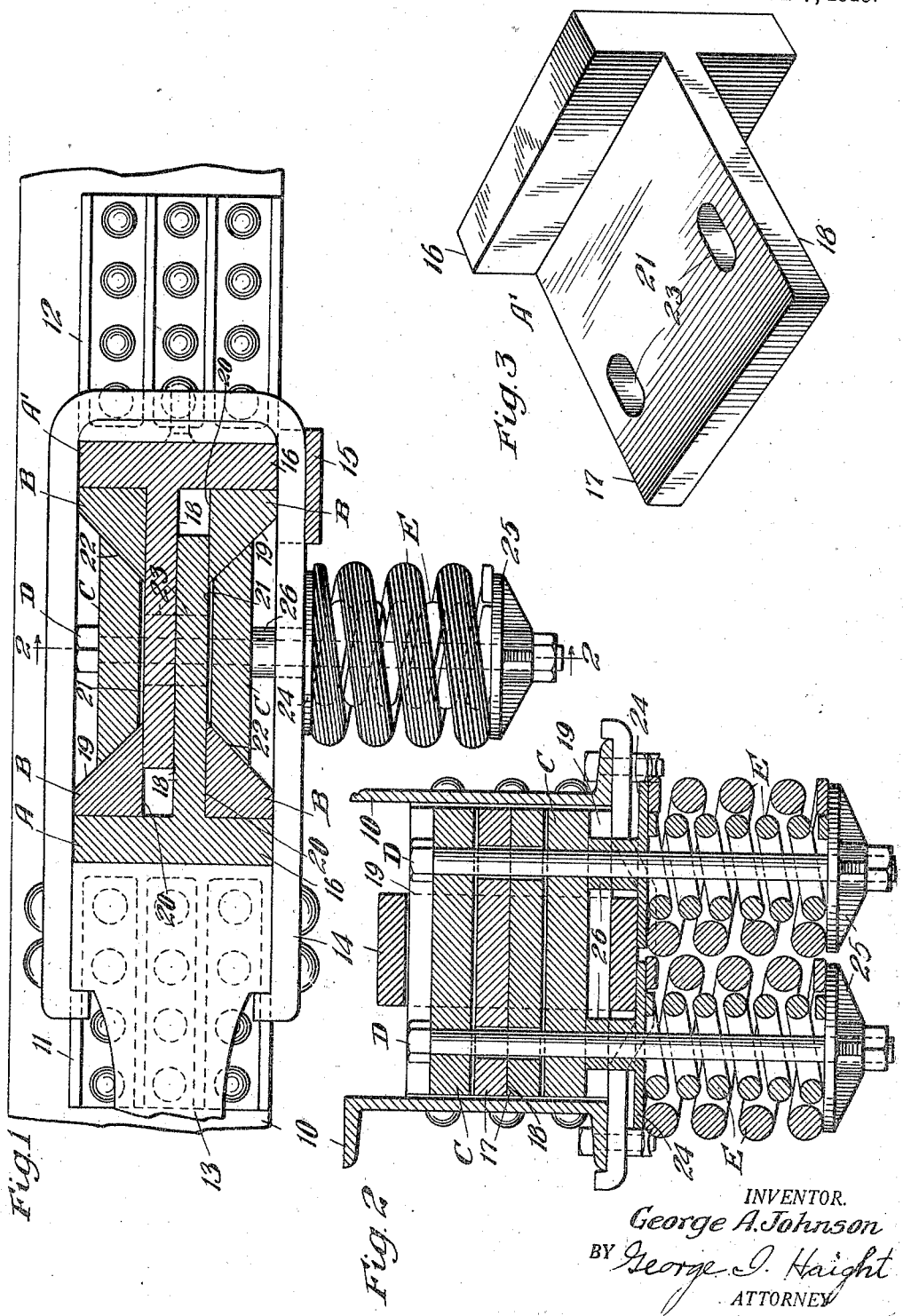

GEORGE A. JOHNSON, OF CHICAGO, ILLINOIS, ASSIGNOR TO WILLIAM H. MINER, OF CHAZY, NEW YORK.

FRICTION SHOCK-ABSORBING MEANS.

290,221.      Specification of Letters Patent.      Patented Jan. 7, 1919.

Application filed March 12, 1918. Serial No. 221,906.

*To all whom it may concern:*

Be it known that I, GEORGE A. JOHNSON, a citizen of the United States, residing at Chicago, in the county of Cook and State of Illinois, have invented a certain new and useful Improvement in Friction Shock-Absorbing Means, of which the following is a full, clear, concise, and exact description, reference being had to the accompanying drawings, forming a part of this specification.

This invention relates to improvements in friction shock absorbing means.

The object of the invention is to provide a friction shock absorbing mechanism, more particularly designed for railway draft gears and wherein large friction wearing areas are provided and the parts so designed as to be readily and cheaply manufactured in the form of castings.

In the drawing forming a part of this specification, Figure 1 is a part elevational view, part longitudinal, vertical section of a portion of a railway car showing my improvements in connection therewith. Fig. 2 is a vertical, transverse, sectional view, taken substantially on the line 2—2 of Fig. 1. And Fig. 3 is a perspective view of one of the followers employed with my improvements.

In said drawing, 10—10 denote channel-shaped center or draft sills of a railway car to which are secured front and rear stops 11 and 12 in the usual manner. The draw bar 13 of the draft rigging is operatively associated with the friction mechanism proper by any suitable means, such as the yoke 14 and the parts may be supported as by saddle plate 15.

The improved shock absorbing mechanism proper, as shown, includes a front follower A, rear follower A', wedges B—B, outer or side friction member C—C, bolts D—D and springs E—E.

The followers A—A' are made duplicate and each consists of a follower portion proper 16 and an inwardly extending heavy flange 17 of a width corresponding to the width of the follower. Said flange 17 is offset from the center of the follower, as clearly appears from Fig. 1, so as to bring the opposing friction surfaces 18—18 of the two followers in sliding contact with each other on the center line or axis of the gear. The flanges 17 are overlapped to the extent indicated in Fig. 1, the spaces between the ends of said flanges 17 and the opposed followers being equal to the permissible movement of the gear so that said flanges 17 will act as limiting stops to determine the relative approach of the followers A—A'.

The wedges B are all similar and are of substantially right angle triangular formation. Each wedge B has an inclined wedge surface 19 and an inner friction face 20 extending parallel to the axis of the gear and adapted to coöperate with the corresponding outer friction face 21 of one of the flanges 17. The wedges B are arranged as clearly shown in Fig. 1, that is, there are two wedges B on each follower, one of which fits within the corner formed by the flange 17 and the main portion of the follower, and the other bearing against the follower portion proper and seated on the flange 17 of the opposed follower.

The outer or side friction members C—C are wedge-shaped at each end, as indicated at 22—22, and coöperate with the wedge faces 19 of the wedges B—B. The arrangement is such that, as the followers A—A' approach each other, the friction members C—C will be separated in a direction at right angles to the axis of the gear.

To resist the separating movement of the members C—C and consequently resist approach of the followers A—A', the bolts D—D are extended vertically through suitable perforations in the friction members C—C and elongated perforations 23—23 in the flanges 17—17. The bolts D are disposed on opposite sides of the yoke 14 so as to avoid cutting away any of the metal of the latter and on each bolt D is mounted an upper spring follower 24 and a lower spring follower 25, one of the springs E being confined between each pair of followers 24 and 25. The upper followers 24 are provided with sleeve portions 26 which extend past the lower arm of the yoke and bear against the under face of the lower friction member C.

In operation, in buffing, the front follower A will be forced rearwardly while the rear follower A' is held stationary. This relative movement will therefore cause friction to be generated between the engaging friction surfaces 18—18 of the flanges 17. Similarly, friction will be generated between the engaging wedge faces of the wedges B and C while the latter are being forced apart. In addition to the foregoing, friction will be generated between one of the front wedges B and the flange 17 of the rear follower and between one of the rear wedges B and the flange 17 of the front follower A. As will be understood, the springs E acting upon the friction members C—C will tend to resist the relative approach of the followers and will also serve to return the parts to normal after pressure on the followers is released.

I have shown the arrangement with the springs mounted below the draft sills and the bolts extending vertically, but as will be understood by those skilled in the art, the arrangement may be turned through an angle of 90° and have the springs extending horizontally on the outer sides of the draft sills.

It is evident from the preceding description that the followers, wedges and friction members may all be manufactured cheaply and in quantities as castings at relatively small expense. A large amount of friction wearing area is obtained and a high capacity of shock absorbing mechanism produced. The arrangement is also compact, easy to assemble, and the parts so related that upon release, all elements will be returned to their normal proper position.

I claim:

1. In a friction shock absorbing mechanism, the combination with relatively movable end followers having inwardly extended overlapping flanges in sliding frictional engagement, of oppositely arranged wedges on each of said followers, friction members on opposite sides of the overlapping flanges and engageable with said wedges, and spring means for resisting relative approach of said followers and acting through said friction members.

2. In a friction shock absorbing mechanism, the combination with a pair of relatively movable followers, of a friction member movable in unison with each follower, said friction members being overlapped and frictionally engaging, additional friction members and coöperable wedges relatively movable upon relative approach of said followers and acting to force said first named friction members into engagement with each other, and spring means for resisting relative approach of the followers.

3. In a friction shock absorbing mechanism, the combination with a pair of followers having overlapping flanges in frictional engagement, of wedges associated with said followers and movable toward each other upon relative approach of the followers, friction members having wedge-shaped ends coöperable with said wedges and relatively separable in a direction at right angles to the line of relative movement of said followers, and spring means for preventing relative separation of said friction members.

4. In a friction shock absorbing mechanism, the combination with duplicate followers, each having an integral flange, the flanges being overlapped and in sliding frictional engagement, of two wedges mounted on the inner face of each follower, one wedge of each pair being in sliding engagement with the flange of the opposite follower, friction members on each side of said flanges and coöperable with said wedges, said friction members being relatively separable upon approach of the followers, and spring means for resisting said separation of the friction members.

5. In a friction shock absorbing mechanism, the combination with duplicate followers, each having an integral flange, the flanges being overlapped and in sliding frictional engagement, of two wedges mounted on the inner face of each follower, one wedge of each pair being in sliding engagement with the flange of the opposite follower, friction members on each side of said flanges and coöperable with said wedges, said friction members being relatively separable upon approach of the followers, and spring means for resisting said separation of the friction members, said spring means including bolts extending through alined perforations in said friction members and overlapping flanges and springs mounted on said bolts.

6. In a railway draft rigging, the combination with draft sills, draw bar, and yoke-acting means, of front and rear followers having overlapping flanges in sliding frictional engagement, said flanges extending parallel to the axis of the gear, a pair of wedges detachably mounted on the inner face of each of said followers, one wedge of each pair being in frictional engagement with the flange of the opposed follower, friction members coöperable with said wedges and separable at right angles to the axis of the gear upon relative approach of the followers, and spring means acting through said friction members for resisting relative approach of the followers.

In witness that I claim the foregoing I have hereunto subscribed my name this 1st day of Mar., 1918.

GEORGE A. JOHNSON.